United States Patent Office 3,640,970
Patented Feb. 8, 1972

3,640,970
PROCESS FOR PREPARATION OF POLYAMIDES
Shuji Ozawa and Hiroshi Fujie, Tokyo, Japan, assignors to Teijin Limited, Osaka, Japan
No Drawing. Filed Feb. 14, 1969, Ser. No. 799,510
Claims priority, application Japan, Feb. 19, 1968, 43/10,414; Sept. 5, 1968, 43/63,860
Int. Cl. C08g 20/20
U.S. Cl. 260—78 R     8 Claims

ABSTRACT OF THE DISCLOSURE

A process for preparation of polyamides which comprises reacting substantially equimolar amounts of at least one diamine and a dihalide of at least one dicarboxylic acid and in an inert, non-basic organic medium to form a pre-condensate, and thereafter contacting said pre-condensate in said medium with an aqueous solution of a water-soluble acid acceptor. Thus high molecular-weight aromatic polyamides suitable for high temperature uses including co-polyamides having either random or block structure can be obtained with practical easiness even in large scale operations.

---

This invention relates to a process for preparing polyamides from diamines and dicarboxylic acids, and particularly to a novel polymerization process for preparing wholly aromatic polyamides from aromatic diamines and aromatic dicarboxylic acid dihalides.

An object of the invention is to provide a process for manufacturing linear polyamides, in particular, linear aromatic polyamides, which are excellent in resistance to high temperature, solvent, chemicals, and high energy radiations, non-flammability and self-extinguishing properties, ideal for electric and thermal insulators, and can be processed into fibers, films, coatings and other shaped articles, from diamines and dicarboxylic acid dihalides, particularly aromatic diamines and aromatic dicarboxylic acid dihalides.

Another object of the invention is to provide a novel polymerization process which is applicable to a large scale and/or continuous operation, easily regulates the degree of polymerization of the final product, and is capable of preparing block-copolymers in the preparation of copolyamides.

Still another object of the invention is to provide a process for preparation of aromatic polyamides while allowing a slow operation.

Still another object of the invention is to provide a commercial process for production of aromatic polyamides in powder form which are easy to wash to remove soluble impurities.

Heretofore, (a) an interfacial polycondensation method (U.S. Pat. 3,006,899) and (b) a low temperature solution polycondensation method (U.S. Pat. 3,063,966) have been known as a method of preparing aromatic polyamides from aromatic diamines and aromatic dicarboxylic acid halides. These methods are regarded as being more excellent than other methods of obtaining aromatic polyamides such as dehydration condensation by heat between aromatic diamines and aromatic dicarboxylic acids and condensation by heat with removal of phenols between aromatic diamines and diphenyl esters of aromatic dicarboxylic acids. In the dehydration-condensation method, the condensation does not proceed smoothly even at temperatures above 200° C., and in most cases, heat decomposition occurs to form a colored product containing insoluble gel. In the condensation with phenyl esters, the phenyl esters are generally derived from the corresponding acid chloride which, per se, is a better reactant to give polyamides. These condensation methods must be carried out at high temperatures for long periods of time, whereas the first-mentioned two methods described in the U.S. patents may be carried out at room temperature or below and require only a few minutes for the reaction to complete. Thus, the two methods according to the U.S. patents were far more excellent in the preparation of linear aromatic polyamides of a high degree of polymerization, but some problems are still left to be solved in the commercial practice of these methods.

It is known that in the interfacial polycondensation method (a) mentioned above, controlling of the molecular weight of the product is very difficult. The degree of polymerization of the resulting polymer depends upon and is very susceptible to slight changes in non-stoichiometric conditions such as the concentrations of reactants, rates of addition thereof, size of a reactor vessel, the speed of stirring, and the type of solvents to be used. Once reactants have been charged, it is impossible to adjust the degree of polymerization of the final polymer by an additional feed since it is predetermined by a delicate combination of the reaction conditions such as mentioned above. Moreover, when a copolymer is to be prepared according to the method, the main chain structure of the copolymer cannot be controlled. It has also been found that if a large-sized reaction vessel is used in practice, a high polymer is not obtainable by this method.

On the other hand, in the low temperature solution polycondensation method (b) mentioned above, the molecular weight control of the final polymer is rather easy. However, the preparation of high molecular weight products imposes limitation on the selection of solvents to be used, and various difficulties are encountered, for instance, in the separation of a product from the solution and the occurrence of side-reactions. In addition, as the product is always present together with hydro-halic salts as the reaction by-product, removal of which requires a tedious long process such as precipitation-and-rinse or a complicated treatment after shaping the product into an article. It is therefore difficult to obtain a product free from those salts and having a sufficient heat stability.

We have arrived at the process of the present invention by which it is possible to remove all of these defects of the prior arts, and to produce aromatic polyamides having excellent properties. The present invention is applicable even if one or both of the diamine and dicarboxylic acid are aliphatic. The invention provides a process for preparation of polyamides, which comprises reacting substantially equimolar amounts of at least one diamine and at least one dicarboxylic acid dihalide in a polar, non-basic, non-reactive organic liquid medium to thereby form a condensation product of said diamine and said dicarboxylic acid dihalide having a low degree of polymerization, and thereafter contacting said organic liquid medium containing said condensation product with an aqueous solution of a water-soluble acid acceptor.

According to the invention, substantially equimolar amounts of at least one diamine and at least one dicarboxylic acid dihalide are contacted with each other in a polar, non-basic, non-reactive organic liquid medium at a temperature of 100° to 0° C. to form a condensation product of said diamine and said dicarboxylic acid dihalide having a low degree of polymerization; thereafter, said organic liquid medium containing said condensation product is contacted with an aqueous solution of a water-soluble acid acceptor at a temperature of 100° to 0° C.

Both aliphatic and aromatic diamines can be used as the diamines according to the invention. But in order to obtain polyamides having excellent heat stability and resistance to organic solvent, diamines expressed by the following Formula 1 or 2 are suitably used $$H_2N—A—NH_2 \quad (1)$$

or $$H_2N—A—Y—A'—NH_2 \quad (2)$$

In the foregoing formulae, two amino groups are bonded to carbon atoms not adjacent to each other, excepting a case where they are at the peri-position of the naphthalene nucleus; and —A— and —A'— represent a divalent carbocyclic aromatic nucleus, including a case where the hydrogen atom of its aromatic nucleus is replaced by a substituent not reactive under the reaction conditions involved with an acid halide group or amino group. The carbocylic aromatic nucleus includes, for instance, benzene, naphthalene, and biphenyl. The non-reactive substituent includes halogen, lower alkyl, phenyl, acyl, acryloxyl, alkoxycarbonyl, nitro, dialkylamino, acylamino and alkylthio groups which do not react with the acid halide and amine, and also carboxyl, sulfonic acid, and monosubstituted amino groups which react with the acid halide far more slowly than with the amino group. The position or number of substituents is determined so that the reactivity of the two amino groups of the diamines with the acid halide may not be impeded, and the reactivities of two amino groups may not differ too much. Y in the foregoing formula is a member which connect adjoining aromatic nuclei and represent ether, thioether, carbonyl, sulfone, N-substituted imino, amide, N-substituted amide, methylene and alkylidene linkages which are non-reactive with the acid halide.

As the aromatic diamines expressed by the foregoing Formulae 1 and 2, there can be mentioned, for instance, benzene derivatives such as meta-phenylene diamine, para-phenylene diamine, chlorophenylene diamine, toluylene diamine, diamino acetophenone, and amino anisidine, benzidine, 1,5-naphthylene diamine, bis(aminophenyl) ether, N,N-bis(4-aminophenyl) aniline, and bis(aminophenyl) methane. In particular, metaphenylene diamine, (bis(p-aminophenyl) ether and bis(aminophenyl) methane give a polyamide having a preferable resistance to heat. If a polymer of high crystallinity is desired, it is preferable that one aromatic diamine should be contained in an amount of at least 90%. If a polymer having a good solubility is desired, two or more different kinds of aromatic diamines are used in admixture, or an alicyclic or aliphatic diamine is conjointly used. This, however, usually involves deterioration in durability of the polyamides at high temperatures.

Both aliphatic dicarboxylic acid dihalides and aromatic dicarboxylic acid dihalides may be used in the invention. But in order to obtain polyamides having excellent heat resistance and resistance to solvent, aromatic dicarboxylic acid dihalides expressed by the following Formula 3 or 4 are suitably employed.

$$XOC—B—COX \quad (3)$$

$$XOC—B—Y—B'—COX \quad (4)$$

In the foregoing formulae, X represents a halogen atom, usually a chlorine atom. Two acid halide groups are bonded to carbon atoms not adjacent to each other. But a case where they are at the peri-position of the naphthalene nucleus is excluded as it generally does not give good results. —B— and —B'—, like —A— and —A'— described hereinabove, represent a carbocyclic aromatic nucleus, including a case where the hydrogen atom of its aromatic nucleus is replaced by a substituent not reactive with an amino group or acid halide group. The carbocyclic aromatic nucleus includes, for instance, benzene, naphthalene, and biphenyl, and the non-reactive substituent includes not only halogen, lower alkyl, phenyl, acyl, acyloxyl, alkoxycarbonyl, nitro, dialkylamino, and alkylthio groups which do not react with the acid halide and amine, but also carboxyl and sulfonic acid groups, for instance, which react with the amine far more slowly than with the acid halide. The position or number of the subtituents is determined so that the reactivity of two acid halide groups with the amine may not be impeded, and the reactivities of two acid halide groups may not differ too much. Y is a member which connects adjoining aromatic nuclei, and represent ether, thioether, carbonyl, sulfone, N-substituted imino, amide, N-substituted amide, methylene and alkylidene linkages which are non-reactive with the acid halide or amine. Typical examples of such aromatic dicarboxylic acid halides are terephthaloyl chloride, isophthaloyl chloride, 1,4-naphthalenedicarboxylic acid halide, 2,6-naphthalenedicarboxylic acid halide, 4,4'-biphenyldicarboxylic acid halide, 5-chloroisophthaloyl chloride, 5-methoxyisophthaloyl chloride, and bis(para-chloroformylphenyl) ether; among these the dichlorides of terephthalic acid, isophthalic acid, and 2,6-naphthalenedicarboxylic acid are especially preferred.

The dihalides of aliphatic dicarboxylic acids used in the invention are, for instance, expressed by the following formula $$XOC—R—COX$$

wherein R is an alkylene group having 4 to 10 carbon atoms, and X is a halogen atom, preferably a chlorine atom. The examples are dihalides, especially dichlorides, of adipic acid, and sebacic acid.

If a polyamide having high crystallinity is desired, it is preferable that the dihalide of the same aromatic dicarboxylic acid should be used in an amount of at least 90 mol percent. If it is desired to obtain a polyamide having a good solubility, at least two different kinds of aromatic dicarboxylic acid dihalides are used in admixture, or alicyclic or aliphatic dicarboxylic acid dihalides are used individually, or in admixture with each other or with an aromatic dicarboxylic acid halide. This however, generally involves deterioration in durability of the polyamides at high temperatures.

The process of the present invention is useful especially when the above-mentioned aromatic diamines are used. Generally, aromatic diamines are lower in reactivity than aliphatic diamines, and for this reason, it is difficult for the prior methods of preparing polyamides to polymerize aromatic diamines with dicarboxylic acids or their functional derivatives. According to the process of the present invention, however, it is possible to carry out a polymerization reaction between aromatic diamines and aromatic and/or aliphatic dicarboxylic acid dihalides with utmost smoothness.

The first step of the process of the present invention is to react at least one of said diamines with at least one of said dicarboxylic acid dihalides in a polar, non-basic, inert organic liquid medium so that a total amount of said diamine is equimolar to a total amount of said dicarboxylic acid dihalide, whereby a condensation product between said diamine and said dicarboxylic acid dihalide having a low degree of polymerization is formed. Hereinafter, this condensation product having a low degree of polymerization may be referred to as a pre-condensate.

The term "inert" used in the specification means that said organic liquid medium does not substantially react with either of the diamine and dicarboxylic acid dihalide.

In general, a basic organic medium is capable of dissolving polyamides produced by the process of the invention. Thus, the use of such organic liquid medium involves difficulty in separating the resulting polyamides from the medium, and also in controlling the polymerization reaction. This is the reason why the liquid medium used in the invention should be non-basic.

The term "polar" used in the specification and claims means that the organic liquid medium used in the present invention has at least some degree of mutual solubility in water.

Such organic liquid medium usable in the present invention includes, for instance, ethers, ketones, sulfones, halogenated hydrocarbons, esters, nitriles, and nitro compounds. When aromatic dicarboxylic acid dihalides and/or aromatic diamines are used as the starting materials in the present invention, cyclic ethers, linear or cyclic ketones, cyclic sulfones, and aromatic nitro compounds are of particular preference as said liquid medium.

Compounds which more or less swell the resulting polymers are preferable as the organic liquid medium of the invention. Compounds which dissolve the resulting polymers do not give satisfactory results, and amide-type solvents such as N,N-dimethylacetamide are excluded. The organic liquid medium of the invention need not be a single compound, but may be a mixture containing other organic solvent or diluent. As will be mentioned below, such mixture is advantageous in searching for an optimum medium which may give a polymer having a high degree of polymerization. It is also preferable in principle that this organic liquid medium should not contain a substance reactive with the dicarboxylic acid dihalides and diamines. Such reactive substance includes, for instance, water, ammonia, basic substances, acidic substances, alcohols, isocyanates, and acid halides. The addition of a monofunctional reactive substance in a prescribed amount, however, may at times be effective for molecular weight adjustment or terminal group control to improve the practical properties of the resulting polymer. Usually, the amount is limited to less than 1%.

Specific examples of organic solvents usable in the invention as the organic liquid medium are ethers such as diethyl ether, tetrahydrofuran, dioxane, ethylene glycol dimethyl ether, anisole, metanitro anisole and parachloroanisole, ketones such as acetone, methyl ethyl ketone, methyl isobutyl ketone, cyclohexanone, acetophenone, parachloroacetophenone, and orthonitroacetophenone, sulfones such as sulfolane, 2,5-dimethyl sulfolane and 3-methylsulfolane, halogenated hydrocarbons such as methylene chloride, chloroform, 1,2-dichloroethane, α-chloronaphthalene and chlorobenzene, nitriles such as acetonitrile, propionitrile, and benzonitrile, nitro compounds such as nitrobenzene, nitrotoluene, and metanitroanisole, and esters such as ethyl acetate and methyl benzoate.

In the invention, a non-polar solvent, for instance, carbon tetrachloride, and non-polar hydrocarbons such as benzene, cyclohexane, toluene and xylene may be added to the organic polar solvent as a diluent in an amount not more than 30% by weight.

If a product having a high degree of polymerization is to be obtained by the process of the invention, it is preferable that the organic liquid medium should be selected in relation to the composition of an aqueous solution phase under polymerization conditions, apart from the standpoint of cost, economy, and ease of handling as will be mentioned below. Good results, however, are obtained when the organic liquid medium is such as to provide a transparent solution or a stable, smooth emulsion at the time of forming a precondensate. Good results are not obtainable with a system where there are formed particles which precipitate rapidly, and with a system where a tacky precipitate is formed. In the latter case, however, difficulties will be removed mostly by manipulating mechanical conditions of the reaction system.

What is important next in the invention is to prepare a solution or dispersion of a precondensate retaining further polycondensation activity by reacting substantially equimolar amounts of aromatic dicarboxylic acid dihalides and aromatic diamines. The way and order of adding the dicarboxylic acid dihalides and diamines may be optional. According to one way of addition, a solid dicarboxylic acid halide or a solution of it in an organic liquid medium is added to a solution of the diamine in an organic liquid medium. Or a solid diamine or a solution of it in an organic liquid medium may be added to a solution of the dicarboxylic acid dihalide in an organic liquid medium. At this time, an especially rapid stirring is not necessary, and the rate of addition is usually optional. For instance, whether total amounts of these materials are charged within several seconds, or whether they are charged over a pariod of fifty minutes or more, there is no substantial difference in the resulting precondensates. It is however advantageous that the concentrations of the reactants, the order of their addition, the rate of their addition, or the rate of stirring should be chosen so that a homogeneous stable solution or dispersion of precondensates will be obtained upon contacting the dicarboxylic acid dihalides, diamines and organic liquid medium. The preferable temperature for this reaction is usually from 0° to 100° C., particularly 10°–40° C. In many cases, the reaction is carried out at room temperature, but the reaction proceeds even at a temperature below 0° C.

The precondensates obtained by the reaction take a form of solution or dispersion in the liquid medium. The significant characteristic is that the precondensates in the state of dispersion as well as solution retain a potential, high capability of further polycondensation. As will be shown in the working examples which appear later in the pages, the reactivities of the resulting precondensates are not substantially changed by the way of addition of substantially equimolar amounts of the dicarboxylic acid halides and diamines in divided portions, by partial change in the order of adding them, or by adjustment of the stoichiometric excess or lack of the two reactants by additional feeding. The same holds as well when the precondensates are obtained as a dispersion which is heterogeneous to the liquid medium. Such precondensates in a dispersion have an activity equivalent to those in a solution.

When the diamines and dicarboxylic acid dihalides (these are substantially equimolar calculated on the basis of a total amount of each) are reacted in an organic liquid medium in the first step of the invention, a precondensate of these two components is formed. Hydrohalic acid is simultaneously liberated then, and therefore, it is presumed that the terminal amino groups of the precondensate are in the form of hydro-halic salt. For this reason, the precondensates obtained by the process of the present invention can be stored stably for a considerably long period of time, and this is also an advantage of the present invention. It has been confirmed that these precondensates have an inherent viscosity not higher than 0.2 as measured in accordance with the method described in Example 1 which will be given hereinbelow. We therefore consider the precondensates predominantly to be an assembly of homologous molecules having a degree of condensation in the range of about 1 to 20 or more, if a precondensate of one molecule of the diamine and one molecule of the dicarboxylic acid is defined as having a degree of condensation of 1. The precondensates are partly present as a solute in the organic liquid medium, and partly as solid fine particles or swollen particles in the dispersed phase. It cannot be denied that the reactants are partly present as unreacted dicarboxylic acid halide or a hydrohalic salt of the diamine. But that the reaction by these unreacted substances do not constitute a main part of the total polycondensation will be assured by the fact that a high polymer is formed in roughly a quantitative amount by the completion of the reaction.

When the first-step reaction of the invention is over, the organic liquid medium containing said precondensates is contacted with an aqueous solution of a water-soluble acid acceptor to complete the intended polyamide-forming reaction. Any specific means can be employed to contact the organic liquid medium containing the precondensates with the aqueous solution of the acid acceptor so long as both can be brought into intimate contact with each other. For instance, an aqueous solution of an acid acceptor may be added to an organic liquid medium containing precondensates, or vice versa. Both may also be mixed with each other by spraying or injecting them from a nozzle at the same time.

The usable acid acceptors may be inorganic or organic so long as they are water-soluble. From a practical viewpoint, however, inorganic acid acceptors are preferable. As the inorganic acid acceptors, water-soluble strong bases or weak bases are usable. The strong bases include, for instance, alkali metal hydroxides such as lithium hydroxide and sodium hydroxide. As the weak bases, carbonates or bicarbonates of alkali metals such as sodium carbonate, potassium carbonate, and sodium bicarbonate are preferred, but carboxylic acid salts such as sodium acetate, monopotassium oxalate, and dipotassium phthalate are also usable. Hydroxides of alkaline earth metals and salts of weak acids may also be used, but are not particularly practical because of a small solubility. As the organic acid acceptors, there can be mentioned, for instance, tertiary amines, especially preferred being trimethyl amine, triethyl amine, triethylene diamine, quinuclidine, N-methyl-morpholin, and hexamethylene tetramine. In cases when the solubility of the tertiary amines is not high enough, a portion of the liquid medium aforementioned may be added to the aqueous phase.

An amount of the acid acceptor should be as such sufficient to form a salt with a total amount of the hydrohalic acid to be generated from the polycondensation. Generally, however, a slight excess or lack of the amount of the acid acceptor does not greatly affect the formation of a polymer.

We also think that in order for the reaction of the present invention to proceed smoothly, the polar inert organic liquid medium containing said precondensates should have an appropriate affinity for the aqueous solution of the acid acceptor. It is significant therefore to add a surface active agent to the aqueous solution of the acid acceptor, or to the organic liquid medium, preferably to the former. Generally, when the affinity is too large, it is difficult to obtain a high polymer presumably because the solubility of water in the organic medium is too large and the precondensate undergoes hydrolysis. If the affinity is too small, it is also difficult to get a high polymer, presumably because the reaction of the precondensate is too much retarded. A combination of an organic liquid medium and an acid acceptor having an optimum affinity for a chosen combination of a dicarboxylic acid dihalide and a diamine is found out not only by searching the types and compositions of the organic liquid medium, but also by conducting such experiments by varying the ionic strength of the aqueous solution phase. We have found that conditions for giving an optimum affinity to a specific organic liquid medium are often obtained by adding a neutral inorganic salt to the aqueous solution of an acid acceptor. Therefore, even when a high polymer cannot be obtained by using a certain organic liquid medium for a fixed set of the diamine and di-acid halide, the addition of a suitable amount of a neutral inorganic salt to the aqueous solution of an acid acceptor makes it possible to give a high polymer with good reproducibility. Any neutral inorganic salt can be used if only it has a large solubility and is non-reactive with the acid acceptor, the reactants, and the reaction product. Examples are halides of alkali and alkaline earth metals such as sodium chloride, calcium chloride, and potassium chloride, neutral sulfates, nitrates and phosphates of these metals, and halides, neutral sulfates, nitrates, and phosphates of ammonium. In actual practice, it is most beneficial to use the same salt as is generated by the reaction.

Another important feature of the invention is that the contacting of a solution or dispersion of the precondensates with an aqueous solution of the acid acceptor can be effected relatively slowly at a rate such as is readily practicable. The contacting between the said aqueous solution of the acid acceptor with the precondensates can be effected at a temperature of 0° to 100° C., preferably 10° to 40° C. By so doing, polyamides can be easily formed. In a typical example of the interfacial polycondensation method (a) mentioned above, an aromatic dicarboxylic acid halide in an organic medium need be contacted with an aromatic diamine in an aqueous phase as fast as possible. In a reaction system where a final polymer is obtained as a precipitate, a strongly polar compound is used as a solvent, and therefore, an elemental chemical reaction proceeds very rapidly. It is presumed that consequently, the rate of precipitation of the resulting polymer from the reaction system becomes as rapid as the rate of contacting the reactants. For instance, in a typical run of the interfacial polycondensation method in which a solution of a dicarboxylic acid halide in an organic solvent is added to an aqueous solution of a diamine and an acid acceptor, the polymer is formed from a reaction system consisting of a large excess of the diamine and a small amount of the dicarboxylic acid halide at the beginning of the addition, and in the later stage of addition, the polymer is formed from a system consisting of a small amount of the diamine and a large excess of the dicarboxylic acid dihalide. For this reason, the effective molar ratio of the reactants deviates considerably from the required equimolar value. Our experience indicates that such a difficulty constitutes a grave setback against the change in the scale of the reaction. Even when the polymerization is conducted in a large scale, the contacting and mixing must be completed in such a period of time as short as in a successful small scale run; otherwise, a high polymer cannot be obtained. Furthermore, according to the conventional interfacial method, a slight difference in the feeding rate of the reactants greatly fluctuates the degree of polymerization of the final product, and it is thus technically impossible to increase the scale of the reaction.

According to the process of the present invention, on the other hand, substantially equimolar amounts of two reactants are mixed to form a precondensate having a retained polycondensation activity. The rate of contacting and mixing these two reaction agents, namely, a dicarboxylic acid dihalide and a diamine, is almost optional. In a second step of the reaction, an amount of each of the diamine and the dicarboxylic acid dihalide is always maintained equimolar at any point of the reaction operation, and good reaction conditions are always ensured. According to our experience, no difficulties were encountered even when the scale of the reaction was increased 200-fold. It has also been found that if the concentration and other reaction conditions are controlled, a considerably slow reaction operation is allowable in the second step, and consequently, polyamides of uniform quality can be obtained.

In the present invention, a part of the organic liquid medium to be used in the reaction is another material which may be added to the aqueous solution of an acid acceptor for the purpose of adjusting, the affinity of the two phases to be reacted. The aqueous solution phase containing the organic liquid medium may either be a homogeneous phase or heterogeneous phase. It is not particularly necessary that the organic liquid medium to be added to the aqueous solution phase should be dehydrated. The addition of the organic liquid medium to the aqueous solution phase not only makes it possible to reduce the amount of the dehydrated solvent to be used to form the precondensates but also can give rise to an increase of the concentration of the precondensate in the solution or the dispersion to be used for forming polyamides.

The final form of the reaction system for forming polyamides according to the process of the invention is a dispersion of an insolubilized polymer in a two-phase system or in a continuous homogeneous phase. The resulting polymer can be easily recovered by filtration or centrifuge. The used organic liquid medium is recovered when necessary. The separated polymer attains a grade sufficiently practical being free from inorganic impurities by simple wash with water or hot water.

Another important advantage of the process of the invention is realized in conducting copolymerization.

According to the process of the invention, an organic liquid medium containing precondensates is prepared either by the procedure (1) or (2) mentioned below.

(1) At least two diamines and/or at least two dicarboxylic acid dihalides are simultaneously or in an optional order added to an organic liquid medium to form a condensation product having a low degree of polymerization; or, (2) Substantially equimolar amounts of at least one diamine and at least one dicarboxylic acid dihalide are reacted in an organic liquid medium to form a condensation product of said diamine and dicarboxylic acid dihalide having a low degree of polymerization; separately, substantially equimolar amounts of at least one diamine and at least one dicarboxylic acid dihalide at least one of which is different in kind from the first-mentioned diamine and dicarboxylic acid dihalide are reacted in an organic liquid medium which is the same as, or different from, said organic liquid medium to form a condensation product having a low degree of polymerization; and these two precondensates are combined to form a mixture of the organic liquid media containing the precondensates.

Subsequently, the organic liquid medium containing the precondensate obtained either by the procedure (1) or (2) mentioned above is contacted with an aqueous solution of a water-soluble acid acceptor to form a copolyamide.

It is assumed that when a mixture of aromatic dicarboxylic acid halides A and B and a mixture of aromatic diamines X and Y in equimolar amounts are used in accordance, for instance, with the procedure (1), four amide linkages A—X, A—Y, B—X and B—Y are statistically distributed in and among the resulting polymer molecules. However, if in accordance with the procedure (2) mentioned above of the present invention, a mixture of a precondensate prepared from A and X or Y with a precondensate prepared from B and Y or X is reacted with an aqueous solution of an acid acceptor, it is presumed, the amide linkages of the resulting polymer constitutes a block copolymer consisting mainly of A—X or A—Y and B—Y or B—X linkages. It is expected that from the same copolymerization ratio, copolymers of different properties will be obtained. As will be shown in Examples 4, 5 and 6 in the copolycondensation of aromatic dicarboxylic dihalides A and B and aromatic diamine X, a copolymer having different properties can be obtained from the same copolymerization charge, depending upon whether a precondensate is prepared from a mixture of A and B and an equimolar amount of X according to one way of the procedure (1), or it is prepared by adding $(a+b)$ mol of X to $a$ mol of A, and then adding $b$ mol of B according to another way of the procedure (1), or it is prepared by mixing precondensates obtained each from $a$ mol of A and $a$ mol of X, and $b$ mol of B and $b$ mol of X according to one way of the procedure (2). It is considered therefore that the difference in the properties is due to the difference in the distribution of two amide linkages A—X and B—X present in the main chain of the copolymer, and this will substantiate the foregoing expectation. Such a control of the polymer main chain linkages is totally impossible in the conventional interfacial polycondensation method designated (a) above.

Thus, according to the present invention, a copolyamide may be formed by mixing two dicarboxylic acid dihalides X and Y with two diamines A and B in any order shown in the following Table 1, for instance.

TABLE 1

| Method of operation | Order of addition | | | |
|---|---|---|---|---|
| | 1 | 2 | 3 | 4 |
| 1 | (A + B) | (X + Y) | | |
| 2 | (A + B) | X | Y | |
| 3 | A | (X + Y) | B | |
| 4 | A | X | Y | B |
| 5 | A | X | B | Y |
| 6 | (X + Y) | (A + B) | | |
| 7 | (X + Y) | A | B | |
| 8 | X | (A + B) | Y | |
| 9 | X | A | B | Y |
| 10 | X | A | Y | B |
| 11 | A | X | (B ←Y) | |
| 12 | A | X | (Y ←B) | |
| 13 | X | A | (B ←Y) | |
| 14 | X | A | (Y ←B) | |

In the foregoing Table 1, B←Y, for instance, shows that Y is added to B, and Y←B indicates that B is added to Y. The same holds good hereinafter.

The process for the present invention is widely applicable in that by utilizing such characteristics as hereinabove described, polymers having hitherto unknown properties can be produced from a fixed set of reactants. For instance, by designing a high melting crystalline structure with A—X and an amorphous structure having a dyeing site with B—X, one obtains a highly heat resistant high molecular weight polymer having an excellent dyeability. The process of the invention gives many benefits which those skilled in the art can expect from the structure of a block copolymer.

According to the process of the invention, the yield of the resulting polymer is usually at least 90%, and in many cases, it is quantitative. According to the invention, it is possible to produce a polyamide having a high degree of polymerization which has an inherent viscosity ($\eta_{inh}$) of about 0.6 or more and even as high as 3 measured with respect to a solution of 0.5 g. of the polymer in 100 ml. of concentrated sulfuric acid at 30° C. Unless otherwise specified, the inherent viscosity of each of the precondensates and the final polymers obtained in the examples was measured in accordance with this method. When it is desired to give strength to a shaped article from the resulting polyamide, such as fibers and films, it is preferable to use a polyamide having an inherent viscosity of at least 0.9. Such shaped articles not only have excellent mechanical properties at room temperature as is well known, but also exhibit excellent mechanical properties at high temperatures above 250° C. for a long time. Furthermore, in many cases, the obtained products are chemically stable, and have excellent solvent resistance, electric properties, dielectric characteristics, flame-retardant properties, and self-extinguishing properties.

Polymers obtained by the process of the present invention which is excellent in many ways can be used in various forms. Particularly when they are used in the forms of fibers, films, and solutions, the excellent properties of the polymers are fully exhibited and the obtained shaped articles are valuable. In the form of fibers, they are useful as curtains, carpets, interior decoration articles, industrial materials which are to be exposed for a long time to high temperatures, such as tires, conveyor belts, ropes, filters, gaskets and electric insulating cloths, and also protecting wears or working wears for people who work under such working environments. As the film, they are useful as the lining and surface materials for electric and electric components, automobiles and aircraft, as packaging materials for articles to be exposed to high temperatures and high energy irradiation, and also as lining and laminating materials for anti-corrosive valves, containing, and high temperature gas treating apparatus. The solutions of the polymers obtained according to the present invention are valuable as varnishes, adhesives, wire enamel, and covering materials for woven fabrics because of their excellent resistances to solvent and heat, and excellent flames retardant properties.

The process of the invention will further be described below with reference to the working examples. It should be noted however that the concept of the invention will not be limited at all by them.

EXAMPLE 1

In a 500 ml. Erlenmeyer flask, 6.51 g. of isophthaloyl chloride was dissolved into 81 ml. of tetrahydrofuran in a dry nitrogen steam, followed by addition of a solution of 3.4 g. of meta-phenylene diamine in 81 ml. of tetrahydrofuran while stirring. The resulting emulsion was divided into a solid portion and a solution portion by centrifugal separation. According to the infrared spectrum of the solid portion observed by the KBr tablet method, an absorption at 1750 cm.$^{-1}$ considered to be due to the carbonyl group of the acid chloride, an absorption in a wide range of 2500 to 3100$^{-1}$ considered to be due to the amine hydrochloride, and all of the major absorptions of poly (meta-phenylene isophthalamide) were observed. The solid portion was washed with an alkali and an acid to give a product having a weight of 4.53 g. (59% yield) and an inherent viscosity of 0.14.

According to the infrared spectrum of the evaporation residue of the solution portion, a clear absorption of the carbonyl group of the acid chloride was observed, and other major absorptions closely resembled with the infrared absorption spectrum of isophthal-dianilide. A white powder obtained by treating the solution portion with an alkali and an acid had a weight of 2.18 g. (29% yield) and an inherent viscosity of 0.09.

EXAMPLE 2

In a 50 ml. Erlenmeyer flask, 0.350 g. of isophthaloyl chloride was dissolved into 5.8 ml. of tetrahydrofuran, followed by addition of a solution of 0.205 g. of meta-phenylene diamine in 6.4 ml. of tetrahydrofuran to form a white emulsion. A solution of 0.365 g. of sodium carbonate and 4.33 g. of common salt in 19.2 ml. of water was added thereto while stirring at a high speed. The obtained white polymer had an inherent viscosity of 0.25.

A solution of 0.04 g. of isophthaloyl chloride in 0.6 ml. of tetrahydrofuran was added to the so prepared white emulsion, followed by further addition of a solution of 0.41 g. of sodium carbonate and 4.2 g. of common salt in 19.2 ml. of water. The obtained polymer had an inherent viscosity of 1.30. (This corresponds to method 8 in Table 1 in which X=Y and A=B.)

EXAMPLE 3

In a 50 ml. Erlenmeyer flask, 0.390 g. of terephthaloyl chloride was disolved into 6.4 ml. of tetrahydrofuran, followed by addition of a solution of 0.18 g. of meta-phenylene diamine in 5.8 ml. of tetrahydrofuran. A slightly yellowish emulsion was obtained. A solution of 0.41 g. of sodium carbonate and 4.2 g. of common salt in 19.2 ml. of water was added to the emulsion while stirring. A slightly yellowish precipitate of a polymer was obtained. This polymer precipitate had an inherent viscosity of 0.28.

After allowing the emulsion to stand for about 5 minutes, a solution of 0.02 g. of meta-phenylene diamine in 0.6 ml. of tetrahydrofuran was added thereto, and the mixture was contacted with an aqueous solution of sodium carbonate and common salt having the same composition as the above-mentioned aqueous solution. The obtained polymer had an inherent viscosity of 0.74. (This corresponds to the method 7 in Table 1 in which A=B and X=Y.)

EXAMPLE 4

Methyl ethyl ketone dried to a water content below 3 mg./100 ml. was used as a solvent. In a well dried 50 ml. Erlenmeyer flask, 374 mg. of isophthaloyl chloride was dissolved into 5.8 ml. of the solvent, followed by addition of a solution of 208 mg. of meta-phenylene diamine in 6.4 ml. of the solvent. Further, a solution of 18 mg. of sebacic acid chloride in 0.6 ml. of the solvent was added. While stirring the mixture vigorously, an aqueous solution consisting of 19.2 ml. of water and 205 mg. of sodium carbonate was added as fine streams. The obtained polymer was separated and purified. It had an inherent viscosity of 1.10. When it was heated in air at a rate of 5° C. per minute, it began to lose its weight at a temperature of 370° C. (This corresponds to method 8 in which A=B.)

For the purpose of comparison, meta-phenylene diamine was added to a previously prepared mixture of the isophthaloyl chloride and the sebacic acid chloride. The obtained polymer had an inherent viscosity of 0.69, and began to decrease in weight at a temperature of 340° C. (This corresponds to method 6 in Table 1 in which A=B.)

In the foregoing procedure, the method of preparing the precondensate was changed as follows:

Isophthaloyl chloride (374 mg.) was dissolved into 5.8 ml. of methyl ethyl ketone, followed by addition of a solution of 200 mg. of meta-phenylene diamine in 5.8 ml. of the same solvent to form an emulsion. Separately, 18 mg. of sebacic acid chloride was dissolved into 0.6 ml. of the solvent, followed by addition of a solution of 8 mg. of meta-phenylene diamine in 0.6 ml. of the solvent to form a stable emulsion. The two emulsions were combined, and as a precondensate, were reacted with an acid acceptor as in the foregoing. The obtained polymer had an inherent viscosity of 1.48. It began to exhibit reduction in weight at a temperature of 385° C. Also, the polymer was insoluble in dimethyl acetamide at a concentration of 10%. (This corresponds to the method 14 in Table 1 in which A=B.)

EXAMPLE 5

In a dried 200 ml. Erlenmeyer flask, 3.51 g. of isophthaloyl chloride was dissolved into 58 of dry tetrahydrofuran. While stirring the solution, a solution consisting of 2.06 g. of meta-phenylene diamine and 64 ml. of tetrahydrofuran was added to form a white emulsion. Further, a solution of 0.39 g. of terephthaloyl chloride in 6 ml. of tetrahydrofuran was added. Separately, an aqueous solution consisting of 192 ml. of water, 4.07 g. of sodium carbonate, and 57.2 g. of common salt was prepared in a blender having an inner capacity of about 600 ml. While stirring this aqueous solution vigorously, the already prepared emulsion was added. After a lapse of about 5 minutes, the resulting polymer was separated, washed with hot water, and then dried. The polymer had an inherent viscosity of 1.40. An attempt to dissolve it into dimethyl formamide at a concentration of about 5% failed, and it was only swollen. (This corresponds to the method 8 in Table 1 in which A=B.)

The reaction was conducted on the same scale in accordance with the method 6 in Table 1 in which A=B. The obtained polymer had an inherent viscosity of 1.01, and was soluble in dimethyl formamide at a concentration of 5% to form a clear transparent solution.

In a dried 200 ml. Erlenmeyer flask, 3.51 g. of isophthaloyl chloride was dissolved into 58 ml. of dry tetrahydrofuran, followed by addition of a solution of 1.85 g. of meta-phenylene diamine in 58 ml. of tetrahydrofuran while lightly stirring. A white emulsion was obtained. Separately, in a 50 ml. Erlenmeyer flask, 0.39 g. of terephthaloyl chloride was dissolved into 6 ml. of tetrahydrofuran, followed by addition of a solution of 0.21 g. of meta-phenylene diamine in 6 ml. of tetrahydrofuran to thereby form a creamy emulsion. A mixture of the creamy emulsion and the white emulsion was added to an aqueous solution consisting of 4.07 g. of sodium carbonate, 57.2 g. of common salt and 192 ml. of water prepared separately in a 600 ml. blender, and the mixture was thoroughly stirred. The obtained purified polymer had an inherent viscosity of 1.06, and was insoluble in dimethyl formamide at a concentration of 5%. (This corresponds to the method 14 in Table 1 in which A=B.)

EXAMPLE 6

In a well-dried 50 ml. Erlenmeyer flask provided with a stirrer, 390 mg. of isophthaloyl chloride was dissolved into 6.4 ml. of dry tetrahydrofuran in a dry nitrogen steam, followed by pouring with an injector a solution of 184 mg. of meta-phenylene diamine in 5.8 ml. of tetrahydrofuran, and further a solution of 40 mg. of an isomeric mixture of bis(aminocyclohexyl) methane in 0.6 ml. of tetrahydrofuran. While stirring them, an aqueous solution of 407 mg. of sodium carbonate and 4.96 g. of common salt in 19.2 ml. of water was vigorously poured by means of an injector. The obtained white powdery polymer after purification and an inherent viscosity of 0.63. When it was heated in air at a rate of 5° C. per minute, it began to lose its weight at a temperature of 360° C. (This corresponds to the method 7 in Table 1 in which X=Y.)

For the purpose of comparison, the amines in the foregoing procedure were added as a mixture. The obtained polymer had an inherent viscosity of 0.83. When it was heated in air at a rate of 5° C. per minute, it began to decrease in weight at a temperature of 330° C. (This corresponds to the method 6 in Table 1 in which X=Y.)

EXAMPLE 7

In accordance with the low temperature solution method (b) described in the body of the specification, 11.8 ml. of dry tetrahydrofuran, 204 mg. of meta-phenylene diamine, and 0.54 ml. of triethylamine were put into a 50 ml. Erlenmeyer flask in a nitrogen atmosphere. While stirring the mixture well, a solution consisting of 390 mg. of isophthaloyl chloride and 1.0 ml. of dry tetrahydrofuran was added. A viscous irregular solid was obtained, which had an inherent viscosity as low as 0.68.

On the other hand, in accordance with the process of the present invention, a home blender (Toshiba MX–20S) was well dried, and charged with a solution consisting of 8.72 g. of isophthaloyl chloride and 105 ml. of tetrahydrofuran. Subsequently, while stirring the mixture, a solution consisting of 4.65 g. of meta-phenylene diamine and 100 ml. of tetrahydrofuran was added. A white emulsion was obtained. The subsequent addition thereto of a solution consisting of 8.9 g. of triethylamine, 25 ml. of water and 20 ml. of tetrahydrofuran gave a powdery polymer having an inherent viscosity of 1.02.

For the sake of comparison, 1.3 ml. of water was added beforehand in the above-mentioned low temperature solution method. The resulting polymer was found to have an inherent viscosity of 0.43.

EXAMPLE 8

In a 30 ml. beaker, 307 mg. of isophthaloyl chloride and 132 mg. of terephthaloyl chloride were dissolved into 8 ml. of methyl ethyl ketone having a water content of 2.3 mg./100 ml. in a dry nitrogen stream. While lightly stirring the mixture, a solution consisting of 234 mg. of meta-phenylene diamine and 8 ml. of methyl ethyl ketone having the same water content was added. A white emulsion was obtained. The emulsion was injected rapidly by a syringe into a solution of 270 mg. of sodium carbonate in 16 ml. of water prepared separately in a 100 ml. beaker and being under vigorous stirring. The reaction system momentarily turned light yellow, but in several seconds, became white. After a lapse of one minute, the resulting product was separated by filtration, washed thoroughly, and dried. There was obtained 503 mg. (98% yield) of a final polymer having an inherent viscosity of 1.57.

When the prior interfacial polycondensation method (a) described in the specification was carried out by using the above-mentioned reaction reagents in the same amounts and the same reaction vessels, there was obtained a polymer having an inherent viscosity of 1.62.

A 15-liter reactor provided with a high speed stirrer was charged with 6 liters of water and 103 g. of sodium carbonate. Separately, a solution of 115 g. of isophthaloyl chloride and 49.3 g. of terephthaloyl chloride in 2 liters of dry methyl ethyl ketone was mixed with a solution of 87.6 g. of meta-phenylene diamine in 4 liters of dry methyl ethyl ketone to form a white emulsion of a precondensate. This emulsion was poured into the already prepared aqueous solution of sodium carbonate while stirring. After a lapse of 2 minutes, the product was withdrawn, washed, and dried. The obtained white polymer was found to have an inherent viscosity of 1.67.

In accordance with the prior interfacial polycondensation method (a), the above-mentioned reactor was charged with 6 liters of water, 87.6 g. of meta-phenylene diamine, and 103 g. of sodium carbonate. After dissolving them by stirring, a solution consisting of 6 liters of dry methyl ethyl ketone, 115 g. of isophthaloyl chloride, and 49.3 g. of terephthaloyl chloride was added. The obtained polymer was found to have an inherent viscosity of 0.48.

It is seen from the foregoing example that a polymer having a high degree of polymerization was not obtained in the prior interfacial polycondensation method when the scale of the reaction was increased, but that according to the process of the invention, a polymer of the same properties was obtained under the same stoichiometrical conditions even when the scale was enlarged 300-fold.

EXAMPLE 9

As another example of indicating the prominent feature of the process of the invention, the influence of the time required for feeding reactants upon the inherent viscosity of a final polymer was compared between the process of the present invention and the prior interfacial polycondensation method. The obtained results are given in Table 2.

A 800 ml. home blender (Toshiba MX–20S) was used as the reactor. According to the process of the invention, this reactor was charged with 250 ml. of water, and while stirring, 6.6 g. of sodium carbonate was dissolved into it. A separately prepared mixture of a solution consisting of 8.92 g. of isophthaloyl chloride, 3.82 g. of terephthaloyl chloride and 100 ml. of dry methyl ethyl ketone with a solution consisting of 6.75 g. of meta-phenylene diamine and 150 ml. of dry methyl ethyl ketone was poured into the already prepared aqueous solution of sodium carbonate at almost a constant rate to include polymerization. After a lapse of one minute, the product was withdrawn, and its inherent viscosity was measured. On the other hand, in accordance with the prior interfacial polycondensation method, the reactor was charged with 250 ml. of water, and 6.6 g. of sodium carbonate and 6.75 g. of meta-phenylene diamine were dissolved into it while stirring. A solution consisting of 8.92 g. of isophthaloyl chloride, 3.82 g. of terephthaloyl chloride and 250 ml. of dry methyl ethyl ketone was poured into said solution at almost a constant rate to induce polymerization.

TABLE 2

| Process of the present invention | | Prior interfacial polycondensation method | |
| --- | --- | --- | --- |
| Time required for feeding (seconds) | Inherent viscosity of the polymer | Time required for feeding (seconds) | Inherent viscosity of the polymer |
| 3.0 | 1.03 | 2.8 | 1.07 |
| 6.2 | 1.07 | 6.0 | 0.79 |
| 12.5 | 1.04 | 11.3 | 0.58 |

EXAMPLE 10

In a 50 ml. Erlenmeyer flask, 0.390 g. of isophthaloyl chloride was dissolved into 6.4 ml. of anhydrous tetrahydrofuran, followed by addition over a period of 5 minutes of a solution of 0.204 g. of meta-phenylene diamine in 6.4 ml. of anhydrous tetrahydrofuran while stirring. There was obtained an emulsion.

A solution of 0.41 g. of sodium carbonate and 4.2 g. of common salt in 19.2 ml. of water was added and vigorously mixed with said emulsion. A white suspension was formed. The recovered polymer had an inherent viscosity of 1.36.

The polymer was shaped into a film. The film had a strength at break of 940 kg./cm.$^2$ and an elongation of 5% at room temperature. At 200° C., 65% of the strength at room temperature was retained.

The same emulsion separately prepared was vigorously mixed with a solution of 0.41 g. of sodium carbonate in 19.2 ml. of water. The obtained polymer had an inherent viscosity of only 0.27.

EXAMPLE 11

In a 300 ml. beaker, 4.57 g. of isophthaloyl chloride was dissolved into 125 ml. of methyl ethyl ketone in an atmosphere of dry nitrogen, followed by addition of a solution of 2.43 g. of m-phenylene diamine in 125 ml. of methyl ethyl ketone while stirring to thereby form a white emulsion. In a 800 ml. home blender, 2.89 g. of anhydrous sodium carbonate was dissolved into 250 ml. of water to form an aqueous solution, and the said emulsion was added to the aqueous solution while vigorously stirring. A suspension was obtained. The recovered polymer had an inherent viscosity of 1.55, and the yield of the polymer was 98%.

When the same procedure was repeated by adding 20 g. or 40 g. of common salt to the said aqueous solution, the obtained polymers were found to have an inherent viscosity of 1.08 or 0.72, respectively.

This means that in Example 10, the addition of the neutral salt resulted in an increase of the inherent viscosity of the final polymer, but in this example, it led to a decrease of the inherent viscosity. Tetrahydrofuran used in Example 10 is a solvent freely miscible with water. It is presumed therefore that because the affinity between the tetrahydrofuran phase containing the precondensate and the aqueous solution phase was too large under the reaction conditions, the addition of the neutral salt to the aqueous solution phase would have been effective to restrict the affinity between said two phases. On the other hand, methyl ethyl ketone used in the present example is not freely miscible with water, and it is presumed therefore that the addition of the neutral salt to the aqueous solution phase would have excessively restricted the affinity between said two phases.

It is possible to some extent to anticipate an effect of adding a neutral salt from the solubility of an organic liquid medium in water. Under actual reaction conditions, the affinity may be affected by other factors, and therefore, it is advisable to find out optimum conditions experimentally.

EXAMPLE 12

In a 500 ml. Erlenmeyer flask, 5.85 g. of isophthaloyl chloride was dissolved into 96 ml. of cyclohexanone purified through an alumina-packed column, followed by addition of a solution of 3.06 g. of meta-phenylene diamine in 96 ml. of cyclohexanone. A semi-transparent liquid was obtained. A solution of 6.11 g. of sodium carbonate and 27.4 g. of common salt in 128 ml. of water was added to the liquid, and the mixture was stirred. A white, homogeneous suspension was obtained. It was poured into a large quantity of water. The obtained polymer had an inherent viscosity of 0.24.

The same semi-transparent liquid of the precondensate was separately prepared, and mixed with a solution of 6.11 g. of sodium carbonate and 4.88 g. of common salt in 128 ml. of water. The mixture was stirred, and treated in the same manner as above. The obtained polymer had an inherent viscosity of 0.78.

EXAMPLE 13

A mixed solvent was prepared by adding 20 ml. of dry benzene to 230 ml. of dry acetone. In a 300 ml. beaker, 2.29 g. of isophthaloyl chloride and 2.29 g. of terephthaloyl chloride dissolved into 125 ml. of the mixed solvent, followed by addition of a solution of 2.43 g. of m-phenylene diamine in 125 ml. of the mixed solvent while stirring to thereby form a white emulsion. In a home blender, 2.89 g. of anhydrous sodium carbonate and 21.3 g. of sodium chloride were dissolved into 250 ml. of water to form an aqueous solution, and while stirring vigorously, the said emulsion was added to the aqueous solution. A suspension was obtained. The recovered polymer was found to have an inherent viscosity of 1.40.

It was found that a film shaped from the resulting polymer had a tenacity at break of 940 kg./cm.$^2$ and an elongation of 40% at room temperature, and 60% of the properties at room temperature was retained even at 250° C.

When the same procedure was repeated except that the organic medium consisted only of 250 ml. of acetone, the obtained polymer was found to have an inherent viscosity of 0.53. In this case, benzene added as a diluent gave rise to an increase in the degree of polymerization of the resulting polymer.

It is therefore presumed that like the neutral salts added to the aqueous solution phase as shown in Examples 10 to 12, an organic liquid medium is also effective for controlling an affinity between two liquid phases under reaction conditions if it contains a non-polar solvent. However, since the composition of the organic liquid medium not only affects an affinity for the aqueous solution phase, but also an affinity for the precondensate and the final polymer, it is preferable to determine optimum conditions experimentally.

EXAMPLE 14

In a 50 ml. Erlenmeyer flask, 0.45 g. of sodium carbonate was dissolved into 24 ml. of water. Separately, in a 10 ml. Erlenmeyer flask, 0.432 g. of isophthaloyl chloride was dissolved into 8 ml. of dry tetrahydrofuran, and a solid meta-phenylene diamine was added in an amount of 0.230 g. Continued stirring gave a white emulsion in which a precondensate was dispersed. The obtained emulsion was poured with vigor into the already prepared aqueous solution of sodium carbonate by means of a syringe while stirring vigorously. The resulting polymer was treated in a customary manner to give a final polymer which was found to have an inherent viscosity of 0.37.

When the foregoing procedure was repeated with the amounts of water and tetrahydrofuran changed to 16 ml. respectively, the obtained polymer had an inherent viscosity of 2.08.

It is therefore seen that if an amount of water is too large and tetrahydrofuran is used as the organic liquid medium, an affinity between the organic liquid medium phase and the aqueous solution phase which participate in the reaction becomes excessive, thus making it impossible to obtain a polymer having a high degree of polymerization. When a mixed solvent consisting of 7 ml. of tetrahydrofuran and 1 ml. of toluene is used instead of 8 ml. of tetrahydrofuran with an amount of water maintained at 24 ml. to regulate an affinity for the aqueous phase, the inherent viscosity of the obtained polymer is increased to 1.08.

EXAMPLE 15

In a one-liter home blender, 6.37 g. of meta-phenylene diamine was dissolved into 125 ml. of tetrahydrofuran, and while stirring, a solution of 1.7 g. of terephthaloyl chloride and 10.5 g. of isophthaloyl chloride in 94 ml. of tetrahydrofuran was added in fine streams. An emulsion containing a precondensate was formed. Subsequently, a solution of 12.8 g. of sodium carbonate and 31.5 g. of sodium chloride in 300 ml. of water was added while vigorously stirring. The separated polymer was washed with hot water. There was obtained a white powdery polymer having a weight of 13.3 g. (93% yield) and an inherent viscosity of 1.32. The polymer was easily soluble in dimethyl acetamide, and was capable of forming a stable, transparent dope at a concentration of 20%.

The polymer was spun and drawn. The obtained filaments had a tenacity of 4.0 g./de, an elongation of 30%, and an initial Young's modulus of 60 g./de at room temperature. The properties of the filaments were not deteriorated even after standing for a long time at a temperature of 250° C. The filaments were found excellent in flame-retarding properties, and were self-extinguishing.

EXAMPLE 16

A home blender equipped with three rotary blades was charged with a solution of 15.23 g. of isophthaloyl chloride having a melting point of 44.5 to 45.0° C. in 125 ml. of tetrahydrofuran dehydrated with sodium metal, and while stirring at a speed of about 300 r.p.m., a solution of 8.11 g. of meta-phenylene diamine having a melting point of 62.0 to 63.0° C. in 125 ml. of dehydrated tetrahydrofuran was gradually added as fine streams. A white, smooth emulsion was obtained. The stirring was continued for about 5 minutes, and when the rate of stirring was changed to about 750 r.p.m., a solution of 9.54 g. of sodium carbonate in 250 ml. of water was rapidly added. The stirring was further continued for about 5 minutes.

The reaction mixture increased in viscosity in several seconds, and again decreased. A white suspension was obtained. When the suspension was left to stand, a transparent aqueous solution phase was separated. A white polymer in an amount of 17.5 g. (98% yield) was obtained after filtration. This polymer had an inherent viscosity of 2.52.

The polymer was spun and drawn. The obtained filaments had a tenacity of 5.0 g./de, an elongation of 18%, and an initial Young's modulus of 104 g./de at room temperature. Even when having been left to stand for a long time at a temperature of 250° C., the filaments were hardly deteriorated in properties. The filaments were found excellent in flame-retarding properties, and were self-extinguishing.

EXAMPLE 17

The following experiment has been conducted with a view to showing that the properties of a precondensate obtained in accordance with the invention does not depend upon the manner in which it is prepared.

In a 300 ml. beaker, 3.20 g. of isophthaloyl chloride and 1.37 g. of terephthaloyl chloride were dissolved into 6 ml. of dry methyl ethyl ketone. The addition thereto of a solution of 2.43 g. of meta-phenylene diamine in 244 ml. of dry methyl ethyl ketone gave a white emulsion containing a precondensate. An 800 ml. home blender (Toshiba MX–20S) was charged with 250 ml. of water and 3.9 g. of sodium carbonate. While stirring the solution vigorously, the already prepared white emulsion was added thereto. A white polymer was obtained, which had an inherent viscosity of 1.79.

When the foregoing experiments was repeated using 125 ml. of methyl ethyl ketone as a solvent for the acid chlorides and 125 ml. of methyl ethyl ketone as a solvent for the diamine, the obtained polymer was found to have an inherent viscosity of 1.82.

As an extreme case of the way of distributing the solvent, the foregoing experiment was repeated using 244 ml. of methyl ethyl ketone as a solvent for the acid chlorides and 6 ml. of methyl ethyl ketone as a solvent for the diamine. The obtained polymer was found to have an inherent viscosity of 1.67.

EXAMPLE 18

An 18-liter rectangular open vessel was equipped with a powerful stirrer, and there 130 g. of sodium bicarbonate was dissolved into 5 liters of water. On the other hand, 76.1 g. of isophthaloyl chloride were dissolved into 2.5 liters of methyl ethyl ketone, followed by addition of a solution of 81.1 g. of meta-phenylene diamine in 2.5 liters of methyl ethyl ketone to thereby form a white emulsion. The emulsion was poured into the already prepared aqueous solution of sodium bicarbonate, and the mixture was vigorously stirred. The obtained polymer was found to have an inherent viscosity of 1.71.

EXAMPLE 19

A small-sized laboratory-scale centrifugal pump was fitted wtih a funnel at its suction side so that a liquid flowing from the delivery side might be received by it. An amount of a liquid sufficient for it to be free from bubbles during circulation was measured by operating the pump, and was found to be 26 ml. A circulation system of this pump was filled with 26 ml. of water, and 0.97 g. of potassium carbonate and 6.9 g. of potassium chloride were dissolved into it. On the other hand, 0.725 g. of isophthaloyl chloride was dissolved into 5.8 ml. of dry tetrahydrofuran, followed by addition of a solution of 0.378 g. of meta-phenylene diamine in 16.7 ml. of dry tetrahydrofuran to thereby form a white emulsion, which was then transferred into a syringe. The pump was operated, and the emulsion was injected to a circulating liquid flow at a position of the funnel. The final polymer withdrawn after a lapse of about one minute had an inherent viscosity of 1.35.

EXAMPLE 20

A 800 ml. home blender was charged with 250 ml. of water, and 5.0 g. of sodium hydroxide and 35 g. of common salt were dissolved into it. On the other hand, a solution of 6.45 g. of meta-phenylene diamine in 100 ml. of dry tetrahydrofuran was mixed with a solution of 4.26 g. of isophthaloyl chloride and 7.92 g. of terephthaloyl chloride in 100 ml. of dry tetrahydrofuran to form a light yellow emulsion. The already prepared aqueous solution was added to the emulsion while vigorously stirring. A slightly yellowish green color was developed, and in several seconds, an almost white polymer was obtained. This polymer was found to have an inherent viscosity of 1.10.

EXAMPLE 21

A 50 ml. Erlenmeyer flask was charged with 19 ml. of water, and 5.15 g. of common salt and 0.19 g. of sodium hydroxide were dissolved into it. On the other hand, 0.493 g. of 2,6-naphthalene dicarboxylic acid chloride was dissolved into 6 ml. of dry tetrahydrofuran in a dry nitrogen atmosphere, and a solution of 0.226 g. of hexamethylene diamine in 7 ml. of dry tetrahydrofuran was added gradually so as not to form a lump. The obtained emulsion was added to the said aqueous solution which was being vigorously stirred. A white polymer obtained after a lapse of 2 minutes was treated in a customary manner. It was found to have an inherent viscosity of 0.65.

EXAMPLE 22

In a 50 ml. Erlenmeyer flask, 0.528 g. of isophthaloyl chloride was dissolved into 4 ml. of dry tetrahydrofuran, followed by gradual addition of a solution of 0.520 g. of bis(para-aminophenyl) ether in 13.5 ml. of dry tetrahydrofuran. An emulsion of a precondensate was formed. An aqueous solution of 0.33 g. of sodium carbonate and 4.76 g. of common salt in 19 ml. of water was poured with vigor into the emulsion by means of a syringe. Stirring was continued for about 5 minutes. A great quantity of water was added to dilute the reaction mixture, and a polymer was withdrawn. It had an inherent viscosity of 2.24.

EXAMPLE 23

In a 50 ml. Erlenmeyer flask, 0.33 g. of sodium carbonate was dissolved into 17.6 ml. of water. On the other hand, 0.528 g. of isophthaloyl chloride was dissolved into 7.4 ml. of dry 3-methylsulfolane, and the solution was mixed with a solution of 0.515 g. of bis(p-amino-phenyl) methane in 7 ml. of 3-methylsulfolane to thereby form a slightly yellowish emulsion. The obtained emulsion was added to the said aqueous solution which was being vigorously stirred. After a lapse of about 5 minutes, a light-yellow polymer was withdrawn, which was found to have an inherent viscosity of 1.83.

EXAMPLE 24

In a 50 ml. Erlenmeyer flask, 0.466 g. of sebacoyl chloride was dissolved into 6 ml. of dry chloroform, and a solution of 0.226 g. of hexamethylene diamine in 7 ml. of dry chloroform was gradually added to form a white emulsion. While stirring, 19 ml. of a 1% aqueous solution of sodium hydroxide was poured into it by means of a syringe. After a lapse of several minutes, a polymer was withdrawn. The polymer was found to have an inherent viscosity of 2.07 when it was measured with a solution of 50 mg. of this polymer in 10 ml. of meta-cresol at 30° C.

EXAMPLE 25

A 800 ml. home blender (Toshiba MX-20S) was charged with 250 ml. of water, and 2.8 g. of sodium carbonate and 16.5 mg. of sodium β-amino-ethylenesulfonate as a chain end modifier were dissolved into it. In a separate vessel, 3.26 g. of isophthaloyl chloride and 1.40 g. of terephthaloyl chloride were dissolved into 100 ml. of dry methyl ethyl ketone in an atmosphere of dry nitrogen, followed by addition of a solution of 2.43 g. of meta-phenylene diamine in 150 ml. of dry methyl ethyl ketone to form a white emulsion. While stirring, the emulsion was added to the said aqueous solution. After a lapse of about 2 minutes, the resulting polymer was separated. It had an inherent viscosity of 1.15. According to the infrared spectrum of a film shaped from this polymer, an absorption at 1050 cm.$^{-1}$ was observed, which was assumed to correspond to a terminal —$SO_3$ group.

As illustrated above, in the controlling of a chain end by using a monofunctional compound, the modifier, if oleophilic, can be used as a solution in the organic liquid medium together with a precondensate. This method can be utilized to decrease the degree of polymerization or introduce a useful end group.

EXAMPLE 26

A mixed phthalic acid chloride consisting of 8 parts by weight of isophthaloyl chloride and 2 parts by weight of terephthaloyl chloride as a 0.3 molar solution in methyl ethyl ketone was stored in a solution tank connected to the atmosphere through a desiccant tube. A 0.3 molar solution in methyl ethyl ketone of meta-phenylene diamine was stored in a similar second tank. Further, a 0.17 molar solution of sodium carbonate was stored in a third solution tank. Each of the solutions in the first and second tanks was fed at a rate of 15 ml./min. through inlet pipes into a 12 ml. closed glass vessel provided with a stirring bar, two inlet pipes and one overflowing pipe. An emulsion pouring out through the overflowing pipe was conducted to a 55 ml. closed glass vessel provided with a stirring bar, two inlet pipes and one overflowing pipe. The aqueous solution was led from the third solution tank to another inlet pipe at a rate of 30 ml. per minute. A polymer was recovered from a slurry discharged from the overflooding pipe. The polymer was found to have an inherent viscosity of 1.12.

EXAMPLE 27

A 800 ml. home blender (Toshiba MX-20S) was charged with 250 ml. of water, 120 ml. of methyl ethyl ketone having a water content of 7%, and 3.3 g. of sodium carbonate, and the mixture was vigorously stirred. At this time, methyl ethyl ketone was in a state of over saturation, and constituted two phases. On the other hand, 4.27 g. of isophthaloyl chloride and 1.83 g. of terephthaloyl chloride was dissolved into 130 ml. of dry methyl ethyl ketone having a water content of 1.8 mg./100 ml., and on addition of 3.25 g. of finely divided meta-phenylene diamine, the mixture was thoroughly stirred to thereby form a white emulsion. The obtained emulsion was added to the said aqueous solution, and the reaction was effected for about one minute. A polymer was then withdrawn, and its inherent viscosity was measured. It had an inherent viscosity of 1.67.

When an amount of methyl ethyl ketone having a water content of 7% was changed to 20 ml. in this experiment, the aqueous solution phase was a homogeneous single phase. When at the same time, an amount to the dry methyl ethyl ketone was changed to 230 ml., the obtained polymer had an inherent viscosity of 1.62.

EXAMPLE 28

In a 50 ml. Erlenmeyer flask, 0.466 g. of sebasic acid chloride was dissolved into 6.5 ml. of nitrobenzene. While stirring, a solution of 0.226 g. of hexamethylene diamine in 6.5 ml. of dry nitrobenzene was gradually added to form a somewhat highly viscous, homogeneous, transparent solution. Subsequently, 19 ml. of a 1% aqueous solution of sodium hydroxide was poured into the resulting solution by means of a syringe while stirring the reaction system vigorously. A polymer was precipitated in the reaction system. After a lapse of several minutes, the polymer was withdrawn. The polymer was found to have an inherent viscosity of 1.71 when it was measured with a solution of 50 mg. of this polymer in 10 ml. of meta-cresol at 30° C.

The foregoing experiment was repeated except that the hexamethylene diamine was replaced by an equimolar amount, based on the sebasic acid dichloride, of bis(p-aminophenyl) methane. The obtained polymer was found to have an inherent viscosity of 1.20.

EXAMPLE 29

In a 50 ml. Erlenmeyer flask, 0.351 g. of isophthaloyl chloride was dissolved into 7.2 ml. of ethyl acetate purified through a column of an active alumina, followed by addition of a solution of 0.343 g. of bis(p-aminophenyl) methane in 7.2 ml. of ethyl acetate purified in the same manner to thereby form a slightly yellowish emulsion. While stirring vigorously, an aqueous solution of 0.221 g. of sodium carbonate in 17.6 ml. of water was added to the emulsion. After a lapse of about 3 minutes, a light yellow polymer was withdrawn, which was found to have an inherent viscosity of 0.64.

EXAMPLE 30

In a 50 ml. Erlenmeyer flask, 0.375 g. of adipic acid chloride was dissolved into 6.5 ml. of dry benzonitrile, followed by gradual addition of a solution of 0.226 g. of hexamethylene diamine in 6.5 ml. of dry benzonitrile to thereby form a somewhat highly viscous, colorless, transparent solution. While vigorously stirring, 19 ml. of a 1% aqueous solution of sodium hydroxide was added to the resulting solution. A polymer was immediately precipitated. Stirring was continued for about 3 minutes, and then, a polymer was withdrawn. The resulting polymer was found to have an inherent viscosity of 1.51 when it was measured with a solution of 50 mg. of the polymer in 10 ml. of meta-cresol at 30° C.

EXAMPLE 31

To a solution of 10.15 g. of isophthaloyl chloride in 50 ml. of tetrahydrofuran dried over sodium metal, there was added an already prepared solution of 5.14 g. of meta-phenylene diamine and 0.342 g. of 3,5-diaminobenzoic acid both dissolved in 200 ml. of tetrahydrofuran, dried in the same manner as above, to form a precondensate in white emulsion. Separately, in a home blender (Toshiba MX-20S), 6.36 g. of sodium carbonate was dissolved in 250 ml. of water. Into this solution, the precondensate emulsion was poured under strong agitation to form a white polymer, which was separated after 5 minutes of stirring and was found to have an inherent viscosity of 1.50.

We claim:
1. A process for the preparation of a film-forming polyamide, which consists essentially of (1) reacting sub- stantially equimolar amounts of at least one diamine and a dihalide of at least one saturated aliphatic hydrocarbon or carbocyclic aromatic dicarboxylic acid in a polar, non-basic and inert organic liquid medium in which said film-forming polyamide is insoluble to form a precondensation product having an inherent viscosity of no greater than 0.2 as measured for a solution of 0.5 g. of precondensation product in 100 ml. of concentrated sulfuric acid at 30° C., and (2) thereafter contacting said organic liquid medium containing said precondensation product with an aqueous solution of a water-soluble inorganic acid acceptor for a time sufficient to form said film-forming polyamide.

2. The process of claim 1 wherein at least 90 mol percent of said diamine consists of at least one carbocyclic aromatic diamine of which two amino groups are bonded to nuclear carbon atoms of the aromatic ring which are not adjacent or peri positions.

3. The process of claim 1 wherein substantially equimolar amounts of said carbocyclic aromatic diamine and at least one saturated aliphatic hydrocarbon or carbocyclic aromatic dicarboxylic acid dihalide are contact with each other in said polar, non-basic and inert organic liquid medium at a temperature below 100° C. to form said precondensation product, and thereafter said organic liquid medium containing said precondensation product is contacted with an aqueous solution of a water-soluble inorganic acid acceptor at a temperature in the range of 0–100° C.

4. The process of claim 1 wherein at least two diamines are added to said organic liquid medium to form said precondensation product.

5. A process for the preparation of a film-forming polyamide, which consists essentially of (1) reacting substantially equimolar amounts of at least one diamine and a dihalide of at least one saturated aliphatic hydrocarbon or carbocyclic aromatic dicarboxylic acid in a polar, non-basic and inert organic liquid medium in which said film-forming polyamide is insoluble to form a precondensation product having an inherent viscosity of no greater than 0.2 as measured for a solution of 0.5 g. of precondensation product in 100 ml. of concentrated sulfuric acid at 30° C., and (2) separately reacting substantially equimolar amounts of at least one diamine and at least one dihalide of a saturated aliphatic hydrocarbon or carbocyclic aromatic dicarboxylic acid, said diamine and dihalide being different from those reacted in step (1), in a polar, non-basic and inert organic liquid medium in which said film-forming polyamide is insoluble, the same or different from that of step (1), to form a precondensation product having an inherent viscisity of no greater than 0.2 as measured for a solution of 0.5 g. of precondensation product in 100 ml. of concentrated sulfuric acid at 30° C., and (3) thereafter contacting the mixture of precondensation products of steps (1) and (2) with an aqueous solution of a water-soluble inorganic acid acceptor for a time sufficient to form said film-forming polyamide.

6. The process of claim 1 wherein said dicarboxylic acid dihalide is a dichloride of an aliphatic or carbocyclic aromatic dicarboxylic acid.

7. The process of claim 1 wherein at least 70% by weight of said organic liquid medium comprises at least one organic compound having a melting point not over 50° C. selected from the group consisting of ethers, ketones, sulfones, halogenated hydrocarbons, and nitro compounds.

8. The process of claim 1 wherein a water-soluble neutral inorganic salt is added to said aqueous solution.

References Cited

UNITED STATES PATENTS

| | | | |
|---|---|---|---|
| 3,049,518 | 8/1962 | Stephens | 260—78 |
| 3,063,966 | 11/1962 | Kwolek et al. | 260—78 |
| 3,354,125 | 11/1967 | Smith et al. | 260—78 |

HAROLD D. ANDERSON, Primary Examiner

U.S. Cl. X.R.

260—47 CZ, 47 UA, 63 R, 63 N, 65 R, 95 R